United States Patent [19]
Dobbs

[11] Patent Number: 6,039,426
[45] Date of Patent: *Mar. 21, 2000

[54] SIMPLIFIED PRINT MODE SELECTION METHOD AND APPARATUS

[75] Inventor: Michael D Dobbs, Vancouver, Wash.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/694,944

[22] Filed: Aug. 9, 1996

[51] Int. Cl.[7] .................................................. B41J 29/393
[52] U.S. Cl. ............................................................ 347/19
[58] Field of Search .................................. 347/19, 7, 22, 347/23; 358/504, 406; 235/375

[56] References Cited

U.S. PATENT DOCUMENTS

| | | |
|---|---|---|
| 3,405,555 | 10/1968 | Wissinger et al. . |
| 3,605,615 | 9/1971 | Huck . |
| 3,651,487 | 3/1972 | Washington . |
| 4,003,311 | 1/1977 | Bardin . |
| 4,617,580 | 10/1986 | Miyakawa ................................. 347/16 |
| 5,069,124 | 12/1991 | Schneider . |
| 5,107,332 | 4/1992 | Chan ......................................... 347/19 |
| 5,488,223 | 1/1996 | Austin et al. ........................... 235/375 |
| 5,497,699 | 3/1996 | Mather . |

FOREIGN PATENT DOCUMENTS 0 452 157 A1  10/1991  European Pat. Off. .

*Primary Examiner*—John Barlow
*Assistant Examiner*—Charles W. Stewart, Jr.

[57] ABSTRACT

The described method and apparatus permit much cheaper and quicker print mode selection by at least semi-automating the process. In accordance with one preferred method, a set of sample images produced by different print modes are printed on the media and the user selects the highest print quality from the samples. In accordance with another preferred method, an optical detector makes the print mode selection by examining the printed samples. In accordance with yet another preferred method, the optical detector examines the medium itself for characteristics such as density, reflectivity, fibers, etc. and automatically selects a print mode that is compatible with the print medium.

6 Claims, 2 Drawing Sheets

6,039,426

SIMPLIFIED PRINT MODE SELECTION METHOD AND APPARATUS

TECHNICAL FIELD

The present invention relates generally to ink-jet printers and the various print media used therein. More particularly, it concerns a simplified print mode selection method and apparatus that semi-automatically or fully automatically determines for a particular media type which print mode of the printer's software or firmware driver will produce the highest print quality.

BACKGROUND ART

Ink-jet printer media are designed in a variety of colors, densities, reflectivities, surface textures, etc. Media are sized to be reliably fed through most ink-jet printers, but due to the many listed variables print quality may vary greatly from one medium to another even when the same image is printed by the same ink-jet printer. For example, the significant difference between a transparent sheet of mylar, i.e. a so-called transparency, and piece of heavy, tinted bond stock may produce greatly disparate print quality due to variations in wet ink bleed, image edge roughness, hue, etc. Ink-jet printer drivers, which are typically software or firmware-resident within the printer's controller or sometimes within an attached personal computer or file server, typically provide a variety of print modes for optimizing print quality on a given print medium, but a user may not readily make a proper selection and the default "plain paper" selection may produce unacceptable print quality on a given medium. Many expensive media sheets and a volume of ink may be wasted before the user finds a suitable print mode by a trial-and-error process.

DISCLOSURE OF THE INVENTION

The invented method and apparatus permit much cheaper and quicker print mode selection by at least semi-automating the process. In accordance with one preferred method, a set of sample images produced by different print modes are printed on the media and the user selects the highest print quality from the samples. In accordance with another preferred method, an optical detector makes the print mode selection by examining the printed samples. In accordance with yet another preferred method, the optical detector examines the medium itself for characteristics such as density, reflectivity, fibers, etc. and automatically selects a print mode that is compatible with the print medium.

It is a principal object of the invention to provide a mechanism for semi-automatic print mode selection corresponding to a given print medium use.

It is another object to permit the user to be involved in the print mode selection in an interactive way with the printer driver.

Yet another object is to have the printer driver, upon selection by a user of a new medium, automatically print a test pattern of images on the new medium.

Still another object is to have the user visually inspect the test pattern for print quality and to indicate to the printer driver a selection based upon such inspection.

Another object of the invention is for the print driver to record the print mode selection for subsequent use of the printer with the same medium type.

These and other objects and advantages of the present invention will be more readily understood after a consideration of the drawings and the detailed description of the preferred embodiment which follows.

DETAILED DESCRIPTION OF THE PREFERRED EMBODIMENTS AND BEST MODE FOR CARRYING OUT THE INVENTION

Figure 1:
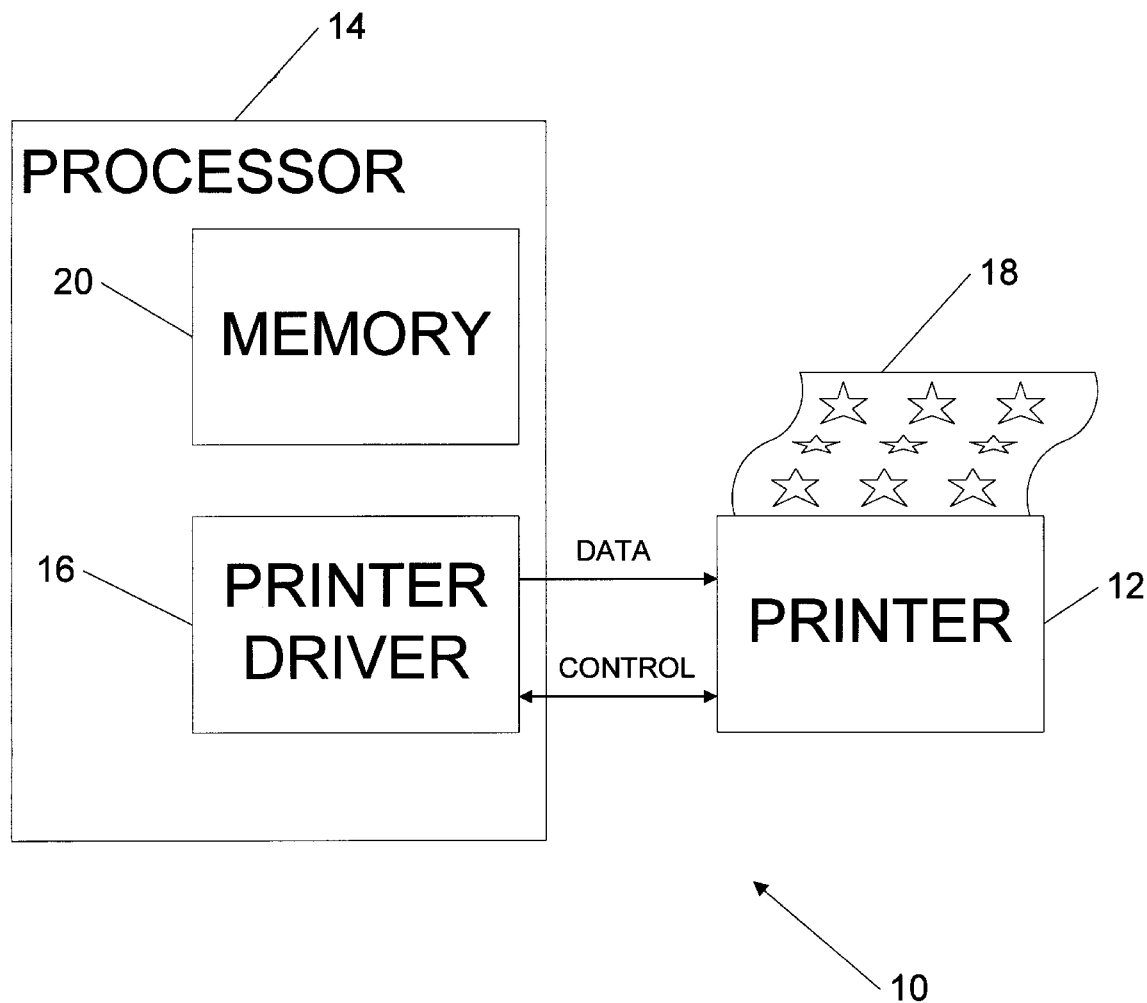
FIG. 1 is a schematic block diagram that illustrates the apparatus of the invention made in accordance with its preferred embodiment.

Referring first to FIG. 1, the invented apparatus is indicated in block diagram form at 10. It may be seen to span a printer 12 such as an ink-jet printer and a host processor 14 such as a personal computer (PC) or file server, i.e. apparatus 10 is depicted as being implemented partly within printer 12 and partly within processor 14. Those of skill in the art will appreciate that, while it shown as spanning printer 12 and processor 14, apparatus 10 may, depending upon the chosen embodiment, form only a part of either. In other words, within the spirit and scope of the invention, apparatus 10 may be implemented entirely within printer 12 or entirely within processor 14, although in accordance with the preferred embodiment described and illustrated herein apparatus 10 is implemented partly in the former and partly in the latter.

Apparatus 10 may be understood to provide for the selection of a print mode for a given print medium. As such, apparatus 10 preferably includes printer 12; a printer driver indicated in FIG. 1 at 16 for controlling the operation of the printer, with the printer driver typically residing as software or firmware within file server or PC 14; and a print medium 18 selectable by a user. In accordance with the preferred embodiment of invented apparatus 10, printer driver 16 is programmed to respond to a selection of print medium 18 by the user by printing a defined test pattern on the medium, the test pattern providing as illustrated plural discrete images corresponding to plural predefined print modes (the images in FIG. 1 being illustrated as nine nearly identical star graphics, but each one understandably distinguishable), the printer driver being programmed further to respond to a selection by the user of one of said images by storing in a memory location, e.g. a memory 20 within computer 14, the print mode corresponding to the one selected image for subsequent printing on print medium 18.

It will be appreciated that print mode selection is performed semi-automatically by interaction between the user and the printer driver. Any suitable means for communicating to printer driver 16 the fact that a new print medium has been loaded in printer 12 and thus that the printer driver should print the predefined test pattern may be used. Similarly, any suitable means may be used for communicating to printer driver 16 the selected one of the plural images that make up the printed test pattern. For example, the user may simply select an icon on a computer screen that tells the printer driver or other printer application program or utility to print a test pattern, or the user may press a pushbutton on the printer's control console that indicates to the connected printer driver that a test pattern should be printed. The selection may be made similarly, as will be appreciated by those of skill in the art.

Printer driver 16, responsive to such an indicated selection by the user then straightforwardly stores or records such a selection in memory and utilizes the corresponding print mode the next time the same print medium is loaded in the printer. For example, the user may be prompted by the printer driver to give a name to the print medium, and the printer driver then may add the new medium to the list of available print media so that, the next time a print job is scheduled wherein such a print medium is indicated as having been loaded into printer 12, the same print mode criteria which printer driver 16 previously stored when the user selected the desired image are used to perform the print job. In this way, by the use of invented apparatus 10, various new print media may be accommodated without the user having to perform the selection process but once for each new media type. Yet control of the selection process is retained by the user, who is part of the selection process and who makes an objective and subjective judgment about the best match between the new medium and the print mode based upon visual inspection of a range of possible print modes that are already a part of most printer drivers.

Figure 2:
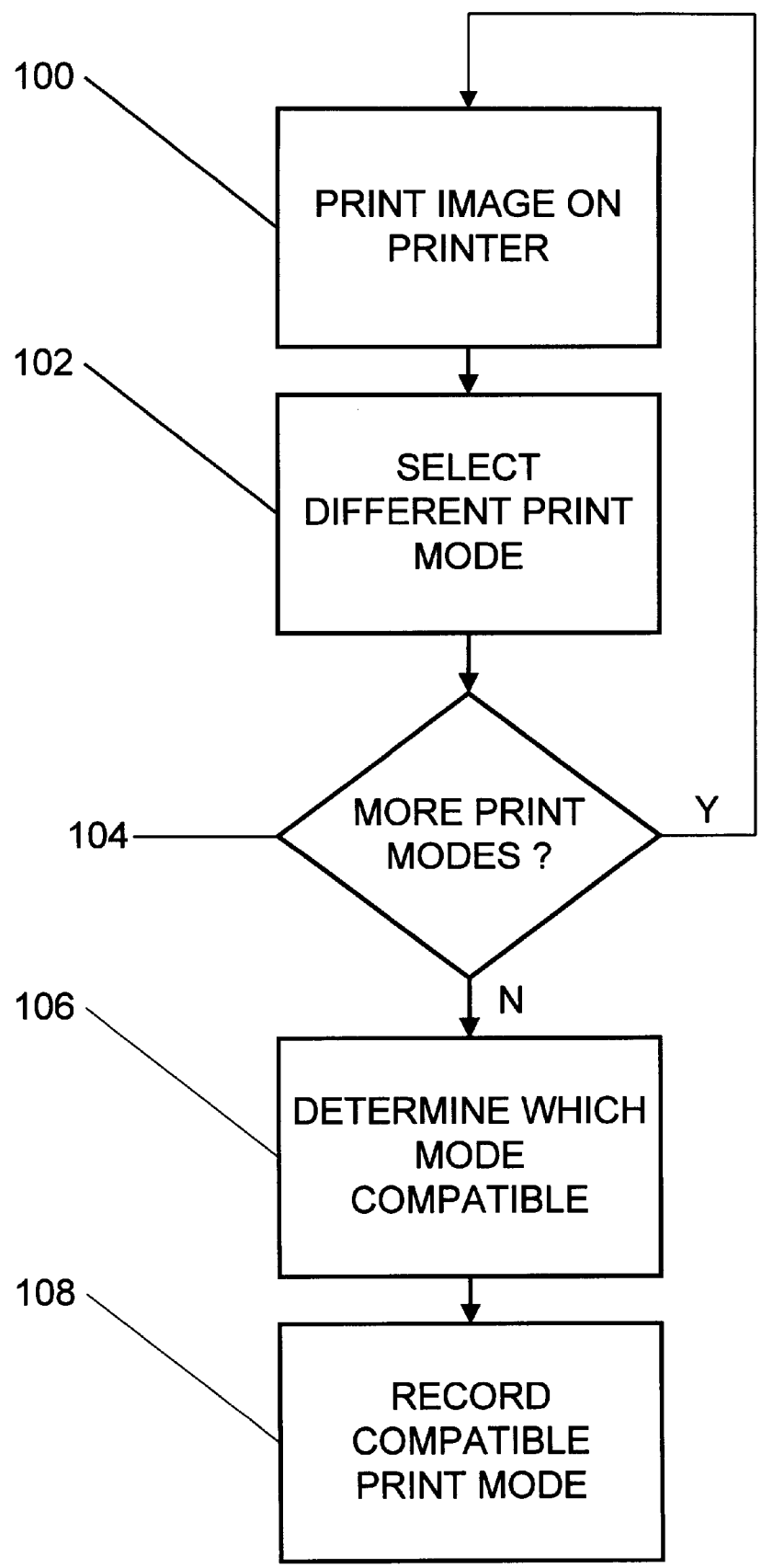
FIG. 2 is a flowchart illustrating the preferred invented methods.

Turning now to the flowchart of FIG. 2, the invented method may be better understood. The invention may be thought of as a computer-assisted method for selecting a print mode on an ink-jet printer that is compatible with a user-selected print medium, with the method including the steps of 1) at 100 ink-jet printing a predefined image on the user-selected print medium in a predefined location; 2) at 102 selecting a different print mode of the ink-jet printer; 3) at 104 determining whether all print modes have been illustrated and if not then at least once repeating the printing and the selecting steps using a different predefined location and a different print mode; 4) at 106 determining which print mode is more compatible with the medium; and 5) at 108 recording, e.g. in memory, the more compatible print mode for use in further ink-jet printing on the user-selected medium.

Preferably, in accordance with the invention, the printing, the selecting and the repeating steps are performed automatically, e.g. by printer driver 16 suitably programmed as will be understood by those of skill in the art. Also preferably, the recording step is performed automatically, e.g. also by printer driver 16 in response to the user's selection of one of the images within the printed test pattern. As indicated by the flowchart of FIG. 2, the determining step preferably is performed visually by a user of printer 12, which may typically be an ink-jet printer. Also as indicated above by reference to FIG. 1, the recording step is performed interactively between the ink-jet printer and a user thereof, e.g. via a computer or file server-connected personal computer or a pushbutton on the printer's control console (not shown for the sake of simplicity). Most preferably, the determining step is performed by the user scanning the predefined images from the medium and comparing them to determine their relative quality by a combination of objective and subjective criteria. In other words, preferably the determining step involves the user analyzing the images for objective print quality indicia including at least one of ink-bleedness, edge-roughness and hue-trueness.

INDUSTRIAL APPLICABILITY

It may be seen then that the invented method and apparatus have broad utility in ink-jet printer applications where media of a wide variety of ink-receiving characteristics are available. Much of the guess-work, and the cost in time and materials of trial and error, may be eliminated by use of the invented semi-automatic or fully automatic method and apparatus. Yet the invention may be implemented inexpensively, and as easily as adding a software or firmware feature to existing printer drivers.

I claim:

1. A computer-assisted method for selecting a print mode on an ink-jet printer that is compatible with a user-selected print medium, wherein the printer has a set of two or more available print modes, the method comprising the steps of:

ink-jet printing a predefined image on the user-selected print medium in a first predefined location using a first available print mode;

automatically selecting a second available print mode of the ink-jet printer, wherein the second available print mode is a different one of the available print modes in the set than the first available print mode, and is not identical to the first available print mode;

automatically printing the predefined image on the user-selected print medium in a second predefined location different from the first predefined location and using the second available print mode, thereby to produce at least a second predefined image that is differentiated from such first predefined image by print mode;

reviewing the first and second predefined images on the recording medium to determine which print mode is more compatible with the medium, wherein said step is performed by the user visually inspecting the first and second predefined images on the medium and comparing the images to determine a relative quality contrast therebetween; and recording the more compatible print mode for use in further ink-jet printing on the user-selected medium.

2. The method of claim 1, wherein said recording step is performed automatically.

3. The method of claim 1, wherein said recording step is performed interactively between the ink-jet printer and a user thereof.

4. The method of claim 1, wherein said reviewing step involves analyzing the first and second predefined images for objective print quality indicia including at least one of ink-bleedness, edge roughness and hue-trueness.

5. Apparatus for selecting a print mode for a print medium selectable by a user comprising:

a printer; and a printer driver for controlling the operation of the printer the printer driver being configured to print a defined test pattern on the medium upon identifying a user's selection of a print medium, the test pattern providing plural discrete images corresponding to plural predefined print modes, said printer driver being configured further to respond to a selection by the user of one of said images by storing the print mode corresponding to said selected image in a memory location, subsequent printing on said print medium being effected using the print mode stored in said memory location.

6. Apparatus for automatically selecting a print mode for a user-selected print medium, the apparatus comprising:

a printer including an input print media hopper for supporting such user-selected print medium prior to printing thereon;

a printer driver for controlling the operation of said printer to feed such print medium through said printer while printing a defined test pattern thereon, said driver printing on such print medium an array of plural predefined graphic images having no information content regarding the user-selected print medium, the plural graphic images each being printed in accordance with a different corresponding print mode attribute which is stored in said printer driver; and a scanner operatively coupled with said printer for automatically scanning the test pattern on such print medium including the plural predefined graphic images, for selecting one of said predefined graphic images from among said plural predefined graphic images using predefined print quality criteria, and for recording the corresponding print mode attributes within a memory, subsequent printing on such user-selected print media being effected using the print mode stored in said memory location.

* * * * *